United States Patent
Navidpour et al.

(10) Patent No.: US 8,073,073 B2
(45) Date of Patent: Dec. 6, 2011

(54) OPTIMIZED CLIPPING FOR PEAK-TO-AVERAGE POWER RATIO REDUCTION

(75) Inventors: Seyed Mohammad Navidpour, Sunnyvale, CA (US); Farrokh Farrokhi, San Ramon, CA (US); Andrea Goldsmith, Menlo Park, CA (US)

(73) Assignee: Quantenna Communications, Inc., Sunnyvale, CA (US)

( * ) Notice: Subject to any disclaimer, the term of this patent is extended or adjusted under 35 U.S.C. 154(b) by 1107 days.

(21) Appl. No.: 11/860,529

(22) Filed: Sep. 24, 2007

(65) Prior Publication Data
US 2008/0101502 A1   May 1, 2008

Related U.S. Application Data

(60) Provisional application No. 60/857,992, filed on Nov. 8, 2006.

(51) Int. Cl.
*H04K 1/02* (2006.01)

(52) U.S. Cl. ........ 375/296; 375/297; 375/299; 375/260; 375/284; 375/285; 375/254; 375/278; 375/346

(58) Field of Classification Search .................. 375/296, 375/297, 299, 260, 284, 285, 254, 267, 278, 375/346
See application file for complete search history.

(56) References Cited

U.S. PATENT DOCUMENTS

| 2005/0238110 A1* | 10/2005 | Yun et al. ...................... 375/260 |
| 2007/0140101 A1* | 6/2007 | Guo et al. ...................... 370/204 |

* cited by examiner

*Primary Examiner* — Kabir A Timory

(57) ABSTRACT

A technique for PAR reduction involves producing an optimized clipping pulse. The optimized clipping pulse may be designed to meet certain requirements, such as a spectral mask target or an EVM target, when applied to a signal.

15 Claims, 13 Drawing Sheets

200

300 →

OPTIMIZED CLIPPING FOR PEAK-TO-AVERAGE POWER RATIO REDUCTION

CROSS-REFERENCE TO RELATED APPLICATIONS

The present application claims priority to U.S. Provisional Patent Application No. 60/857,992, filed Nov. 8, 2006 and which is incorporated herein by reference.

BACKGROUND

One major difficulty in the RF portion of OFDM transmitters is the large peak-to-average ratio (PAR) of the signal amplitude or power. A peak in the signal amplitude and power occurs when some or all of the sub-carriers align themselves in phase. In general, though not necessarily, this occurs once every symbol period. The value of the PAR for power is approximately equal to the number of subcarriers:

$$PAR(dB) \approx 10 \log(N),$$

where N is the number of carriers. For example, in the 802.11a/g OFDM standard, a PAR of approximately 17 dB results if the phases of all 48 data carriers line up during a symbol period.

The high PAR complicates the RF portion of an OFDM transmitter when nonlinear transmit power amplifiers (PAs) are used. For signals with a high PAR, a nonlinear PA must have a large backoff in order to operate in its linear range of amplification even at peak signal values. Without sufficient power backoff, the PA introduces nonlinear distortion, which can degrade system performance and impact the spectral properties of the transmitted signal. Distortion is avoided by backing off the operating point of the PA such that the peak signal level is amplified without distortion. However, this backoff reduces the efficiency of the PA, leading to a larger overall power consumption.

PAR reduction techniques inevitably introduce some signal distortion, since they change the transmitted signal to reduce its PAR. Distortion of the signal must meet the error vector magnitude (EVM, the expected standard deviation between signal constellation points before and after PAR reduction) and spectral mask requirements of the system.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for PAR reduction involves producing an optimized clipping pulse. The optimized clipping pulse may be designed to meet certain requirements, such as a spectral mask target or an EVM target, when applied to a signal.

A method according to this technique may include repeating for a plurality of iterations, finding one or more peaks in the time domain associated with a signal, reducing the one or more peaks using an optimized clipping pulse, and updating the signal. A method according to this technique may include providing a spectral mask target and/or an error vector magnitude (EVM) target, and using the peak clipping pulse with iterative cancellation to meet the spectral mask target and/or the EVM target.

A system according to the technique may include a signal generation block and a PAR reduction (PARR) block. The PARR block may include a peak clipping pulse generator and a plurality of PARR stages coupled to the peak clipping pulse generator. In this example, the PARR block receives a signal from the signal generation block and the peak clipping pulse generator provides a first peak clipping pulse to the first of the PARR stages, which generates a PARR signal. The first peak clipping pulse may be optimized, or in the alternative the combination of the first peak clipping pulse with later peak clipping pulses may be optimized to meet EVM and/or spectral mask targets while minimizing PAR. The PARR signal may be provided to later stages until a final PARR signal is generated.

The description in this paper describes this technique and examples of systems implementing this technique.

BRIEF DESCRIPTION OF THE DRAWINGS

Examples of the claimed subject matter are illustrated in the figures.

DETAILED DESCRIPTION

In the following description, several specific details are presented to provide a thorough understanding of examples of the claimed subject matter. One skilled in the relevant art will recognize, however, that one or more of the specific details can be eliminated or combined with other components, etc. In other instances, well-known implementations or operations are not shown or described in detail to avoid obscuring aspects of the claimed subject matter.

Figure 1:
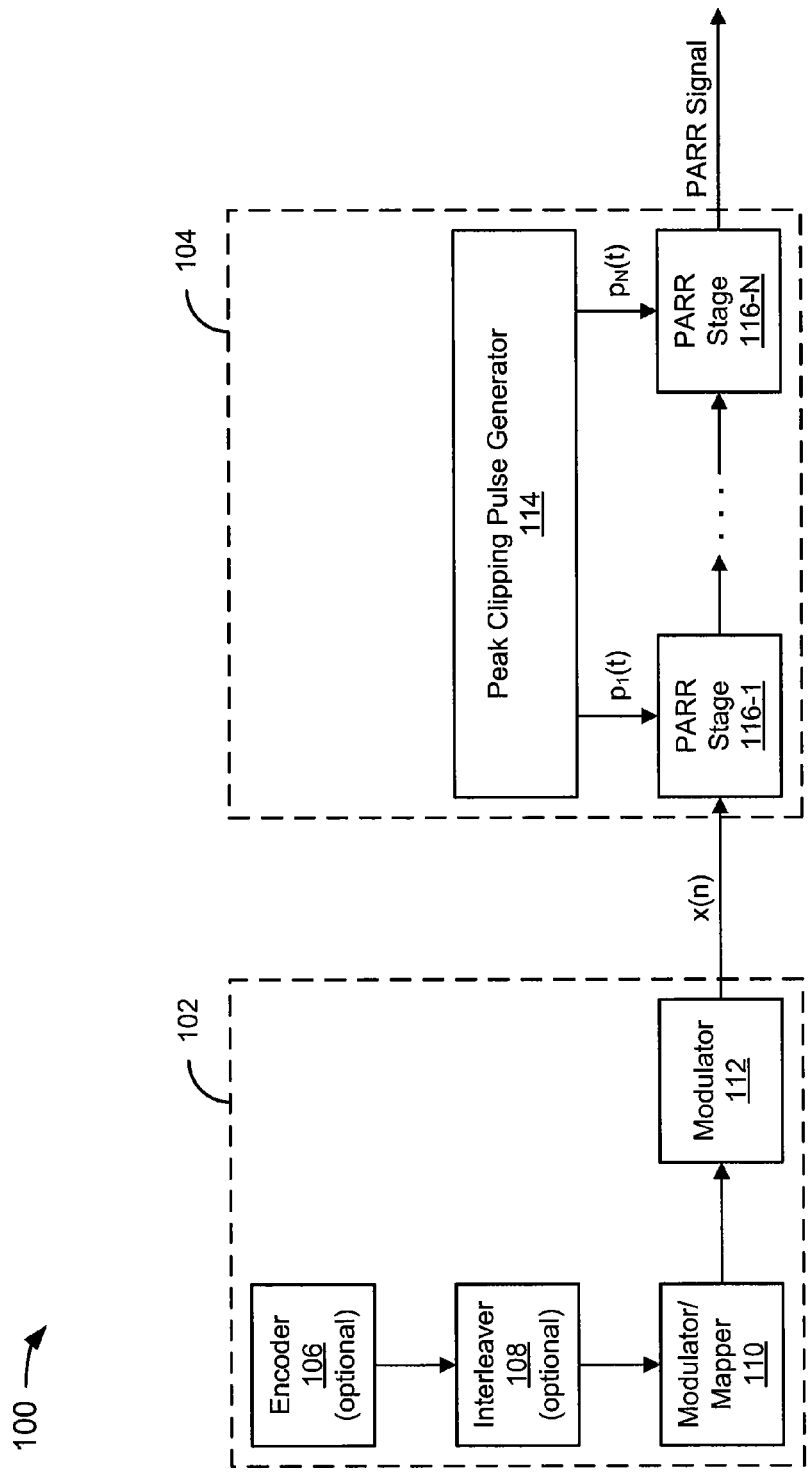
FIG. 1 depicts an example of a signal processing system with peak-to-average ratio (PAR) reduction (PARR) capabilities.

FIG. 1 depicts an example of a signal processing system 100 with peak-to-average ratio (PAR) reduction (PARR) capabilities. In the example of FIG. 1, the system 100 includes a signal generation block 102 and a PARR block 104. In the example of FIG. 1, the signal generation block 102 includes an optional encoder 106, an optional interleaver 108, a modulator/mapper 110, and a modulator 112.

The encoder 106 takes as input uncoded data bits and outputs coded data bits. These coded bits may be more robust to errors introduced during transmission than the uncoded bits, since these errors can be removed through the decoding process at the receiver. Examples of encoders include convolutional encoders, block encoders, turbo encoders, and low-density parity check code encoders. The encoder 106 is optional because it is not necessary to provide the error protection associated with an encoder in signal transmissions, but it is commonly done.

The interleaver 108 changes the order of coded bits input to the interleaver so that coded bits adjacent to each other at the interleaver input will be separated by other coded bits at the interleaver output. The interleaver is typically used in conjunction with the encoder 106 for the following reason. Encoders and their corresponding decoders in the receiver are designed to correct for some number (N) of consecutive coded bits received in error. In some cases signal transmission results in bursts of errors, for example when the signal experiences a deep fade due to multipath or shadowing. If an error burst results in more than N coded bits received in error, then the decoder cannot correct for them. An interleaver scrambles the order of coded bits at its input, and in the receiver a corresponding deinterleaver descrambles them. Thus, a string of M>N coded bits received in error, after descrambling, would typically have fewer than N consecutive coded bits received in error, and hence the errors could be corrected by the error correction code. There are different types of interleavers, such as block interleavers or convolutional interleavers. The interleaver 108 is optional because the type of signal transmission may or may not introduce bursts of errors, and hence interleaving and deinterleaving is not always beneficial.

The modulator/mapper 110 takes coded bits and maps them into complex signal constellations such as MPSK or MQAM. Note that the modulator/mapper may be done jointly with the encoding in a coded modulation block. Examples of coded modulation include trellis coded modulation, lattice-coded modulation, and turbo-coded modulation.

The modulator 112 takes the signal constellations output from the modulator/mapper and multiplexes them onto multiple carrier frequencies or tones. In the case of an orthogonal frequency-division multiplexing (OFDM) modulator, the modulator/mapper multiplexes the signal constellations onto carrier frequencies or tones associated with the OFDM modulation. In an alternative, the modulator 112 or the combination of the mapper/modulator 110 and the modulator 112 may be replaced with a known or convenient type of modulator that maps coded bits or signal constellations to a modulated signal with a high peak-to-average power or amplitude ratio of the modulated signal.

In the example of FIG. 1, the signal generation block 102 generates a signal, which is provided to the PARR block 104. The signal is illustrated in the example of FIG. 1 as x(n), and this terminology is maintained throughout this description to refer to a signal that has not been PAR reduced. As was mentioned previously, the modulator 112 may be an OFDM modulator, in which case x(n) may represent an OFDM signal. The signal, x(n), may also be referred to as the "original" signal. It may be noted that any known or convenient components could be used for the purpose of generating a signal; the precise structure of the signal generation block 102 is not critical, so long as the signal generation block 102 is capable of generating x(n) in accordance with the techniques described herein.

The PARR block 104 receives the OFDM signal, x(n), from the signal generation block 102. In the example of FIG. 1, the PARR block 104 includes a peak clipping pulse generator 114, and PAR reduction (PARR) stages 116-1 to 116-N (referred to collectively as PARR stages 116).

The peak clipping pulse generator 114 may include components capable of generating a peak clipping pulse in accordance with the techniques described herein. The peak clipping pulse generator 114 could be a single generator that provides time domain characteristics of a peak clipping pulse. In this paper, the peak clipping pulse is denoted as p(n), while time domain characteristics and frequency domain characteristics of p(n) are denoted respectively by p(t) and p(f). In the example of FIG. 1, since there is potentially more than one stage, the peak clipping pulse generator 114 output is depicted as $p_n(t)$, where n is the current stage. Multistage PARR is described in more detail later with reference to FIG. 9.

The PARR stages 116 may include any number of stages from one to practically any arbitrary number. However, it is expected that time and complexity constraints and decreasing rate of improvement after a certain number of stages will keep the number relatively low, though the exact number of stages chosen for implementation of the techniques described herein is not critical to an understanding of the claimed subject matter, and any number of PARR stages 116 could be used in theory.

In the example of FIG. 1, in operation, the PARR block 104 takes the signal, x(n), from the signal generation block 102, performs a PARR on the signal, and provides a PARR signal as output. This process is described in more detail with reference to the following figures.

Figure 2:
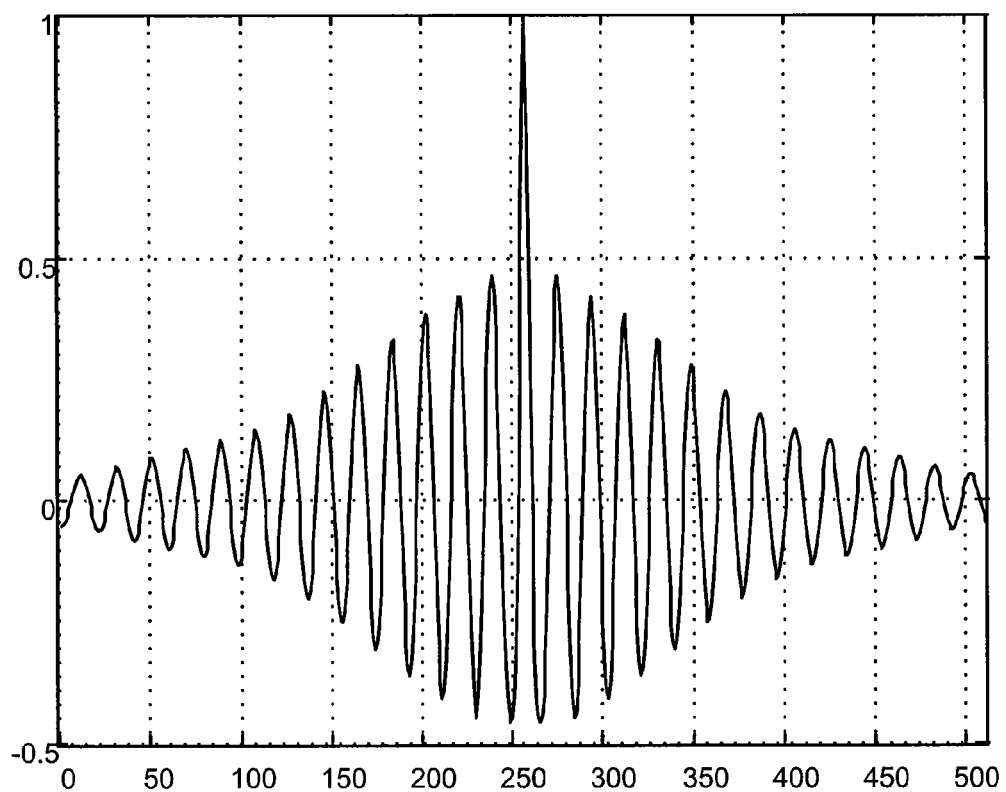
FIG. 2 depicts time domain characteristics, p(t), of an example peak clipping pulse, p(n).
Figure 3:
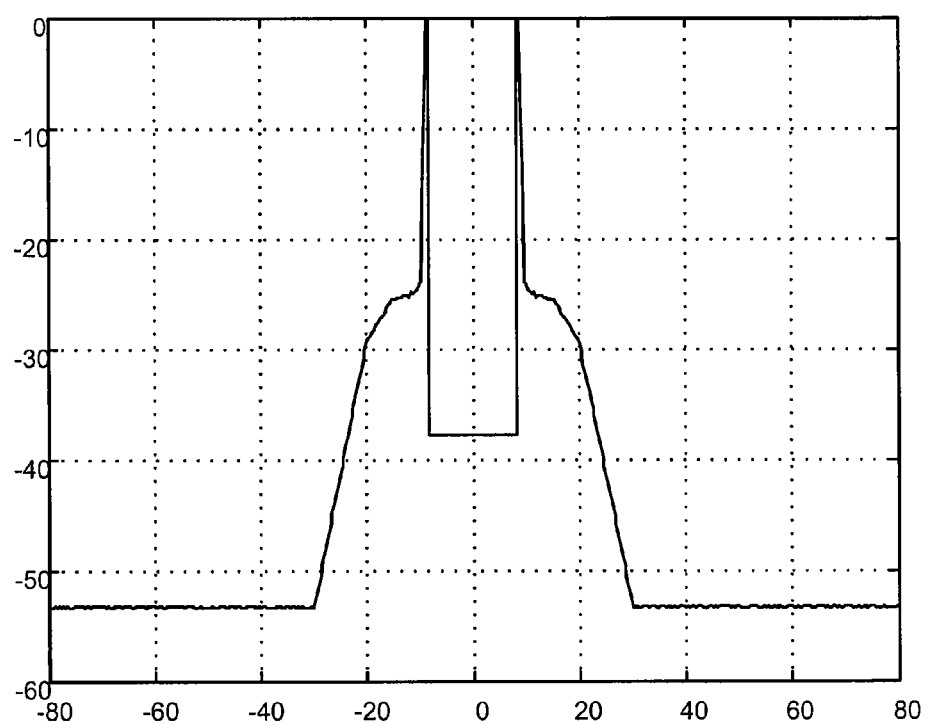
FIG. 3 depicts frequency domain characteristics, p(f), of an example peak clipping pulse, p(n).

A PARR technique clips signal peaks using a clipping pulse optimized to reduce PAR while minimizing distortion. In an embodiment, a signal in the time domain that approximates an optimal clipping pulse, with minimum distortion within the signal band, and frequency components outside the signal band designed to meet the spectral mask requirements of the overall signal, is designed. The signal may be referred to as a peak clipping pulse, p(n). The peak clipping pulse, p(n), may or may not be designed offline. FIG. 2 depicts time domain characteristics, p(t), of an example peak clipping pulse, p(n). FIG. 3 depicts frequency domain characteristics, p(f), of an example peak clipping pulse, p(n). It should be noted that FIGS. 2 and 3 depict characteristics of one of an innumerable number of p(n).

Advantageously, p(n) may be optimized in time without any restrictions in the frequency domain. Thus, it may differ from PAR via tone reservation, where peak clipping pulses are restricted to a given set of, for example, OFDM tones. Even if we do the optimization in the frequency domain, we are not limited to specific tones or frequency bands and instead we put a limitation on the spectral mask in the frequency domain, and may or may not minimize the distortion in a band of interest.

Figure 4:
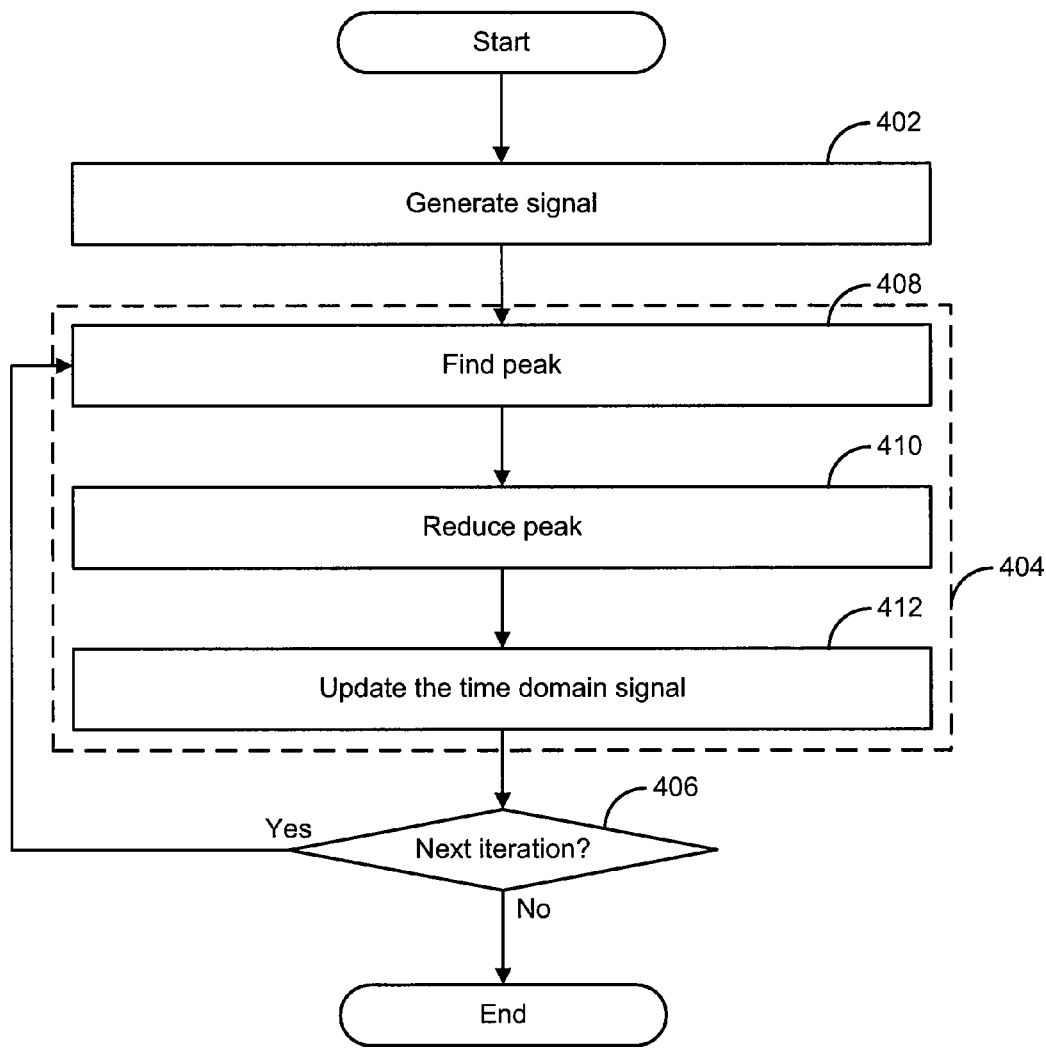
FIG. 4 depicts a flowchart of an example of a method for iterative PARR.

Peaks of a time domain signal may be reduced through a one-shot or iterative process using shifted and scaled versions of the peak clipping pulse. FIG. 4 depicts a flowchart 400 of an example of a method for iterative PARR. This method and other methods are depicted as serially arranged modules. However, modules of the methods may be reordered, or arranged for parallel execution as appropriate.

In the example of FIG. 4, the flowchart 400 starts at block 402 where a signal is generated. The signal may be generated by, by way of example but not limitation, an OFDM modulator or some other signal generating block (see, e.g., FIG. 1, signal generating block 102).

In the example of FIG. 4, the flowchart 400 continues to the iteration block 404 where x(n) is peak-reduced. Iteration block 404 includes blocks 408-412, which are described later.

In the example of FIG. 4, the flowchart 400 continues to decision point 406 where the flowchart 400 repeats the iteration block 404 (406-Yes) until no further iteration is required or desired (406-No). If the method results in a single pass through the iteration block 404, then the method could be referred to as describing a one-shot process. For this reason, the iteration block 404 (though not necessarily the contents of the iteration block 404) and the decision point 406 are optional.

If a process similar to the example of FIG. 4 results in two or more passes through the iteration block 404, then the method could be referred to as an iterative process, and the blocks 408-412 would represent "an iteration." Since the iteration block 404 is capable of peak cancellation, if the iterative block 404 is repeated at least once, the results of the iterations may be referred to as iterative cancellation. In any case, the flowchart 400 continues to block 408 from either block 402 (initially) or decision point 406 (following an iteration) where a peak—having an amplitude $\alpha$ and a location in time $\nu$—associated with the signal x(n) is found. This peak is typically the largest detected peak.

The flowchart 400 continues to block 410 where the peak is reduced. Reducing the peak may involve shifting and scaling the peak canceller pulse, p(n). For example, p(n) may be shifted in time by $\nu$ and scaled by $(\alpha - PAR_{target}\mu(x))$, where $PAR_{target}$ is the desired target PAR value and $\mu(x)$ is the mean value (E[x(n)]) of the signal.

The flowchart 400 continues to block 412 where the time domain signal is updated. For example, the scaled and shifted pulse p'(n) may be subtracted from the signal x(n), resulting in a new modulated signal $x'(n)=x(n)-(\alpha-PAR_{target}\mu(x))p(n-\nu)$.

In the example of FIG. 4, when referring to any given iteration of the method, the formulae provided above may be rewritten as follows: $x_i(n)$, where i is the current iteration (initially, 0). Thus, the original signal may be denoted as $x_0(n)$. The amplitude and location in time of the detected peak may be respectively denoted as $\alpha_i$ and $\nu_i$. The peak canceller pulse p(n) is then shifted in time by $\nu_i$ and scaled by $(\alpha_i - PAR_{target}\mu(x))$. This scaled and shifted pulse is then subtracted from the signal $x_i(n)$, resulting in a new modulated signal $x_{i+1}(n)=x_i(n)-(\alpha_i-PAR_{target}\mu(x))p(n-\nu_i)$. This subtraction will reduce the peak signal value associated with the modulated signal at time $\nu_i$ to meet the desired PAR target. If the reduction is one-shot, the flowchart 400 terminates after this peak canceling operation. If the process is iterative then the clipping is repeated with the new signal $x_{i+1}(n)$.

The method continues for M iterations. $M \geq 1$ can be a fixed parameter of the design dictated by delay and processing constraints, or it can be based on results of the iterations along with some number of iterations, e.g. the flowchart can terminate when the maximum signal peak drops below the target peak value (after which the processing hardware could be shut down to save power if the target peak value is reached before the number of iterations). The number of iterations may be fixed, it may depend on a fixed target PAR, it may depend on the number required to reach a given PAR target, it may depend on the number required such that the performance benefit of additional iterations is below a given number, or it may depend on some other convenient number, or even be arbitrary. The modulated signal on the mth iteration is thus $x_m(n)=x_{m-1}(n)-(\alpha_{m-1}-PAR_{target}\mu(x))p(n-\nu_{m-1})$. The expectation $\mu(x)$ can be taken on each iteration, i.e. the mean on the mth iteration can be taken as $(E[x_m[n]])$ for presumably greatest accuracy. However, the mean is not expected to change much as a result of the peak clipping, and thus computational complexity and delay can be reduced by computing the mean for the original modulated signal and setting $\mu(x)=E[x_0[n]]$ in all subsequent iterations.

Figure 5:
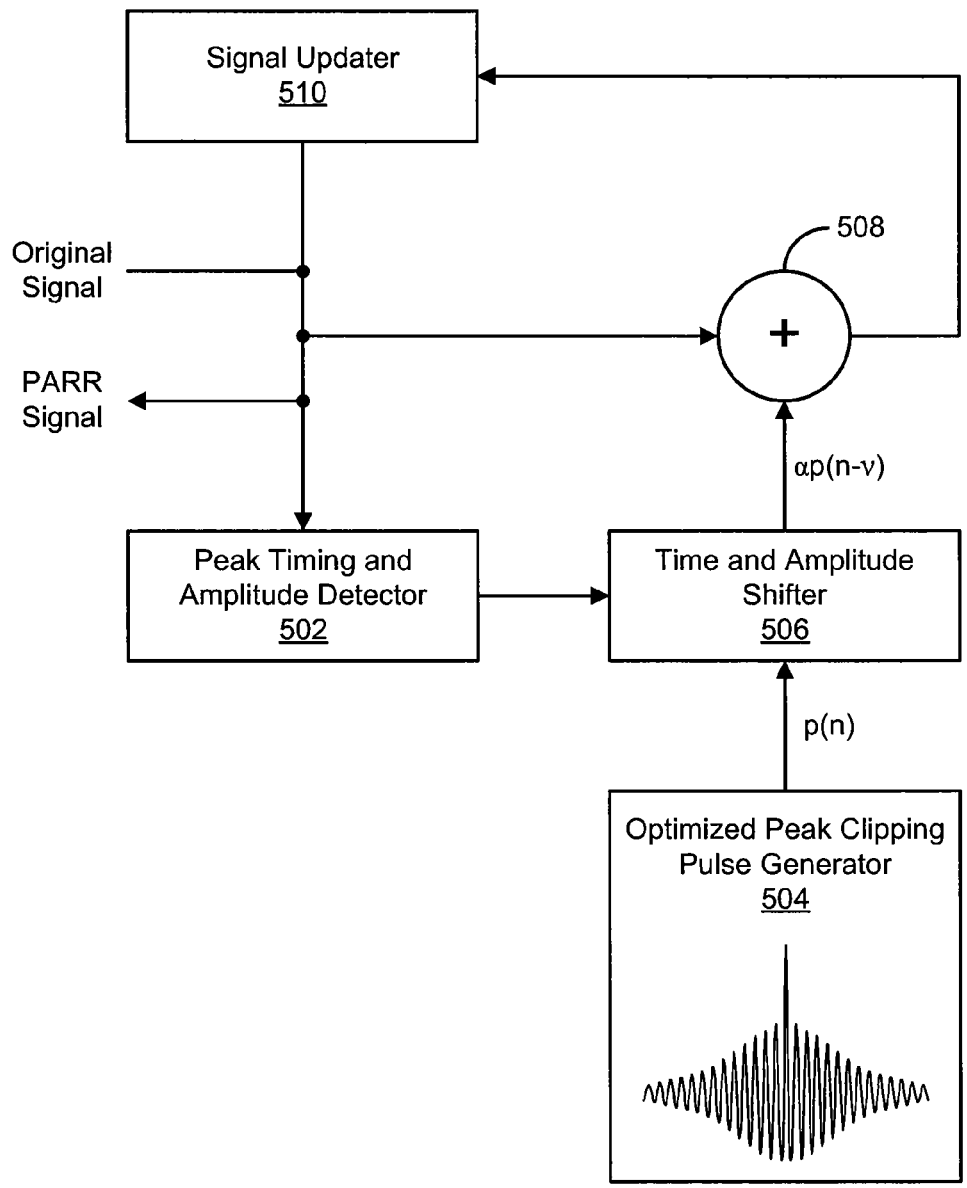
FIG. 5 depicts an example of a system capable of iterative PARR.

FIG. 5 depicts an example of a system 500 capable of iterative PARR. The system 500 includes a peak timing and amplitude detector 502, an optimized peak clipping pulse generator 504, a time and amplitude shifter 506, an adder 508, and a signal updater 510. In the example of FIG. 5, initially, an original signal is received at the peak timing and amplitude detector 502, where the amplitude, $\alpha$, and location in time, $\nu$, of the largest peak of the signal is detected. In parallel, though not necessarily concurrently or simultaneously, $\alpha$ and $\nu$ are provided from the peak timing and amplitude detector 502 and a clipping pulse, p(n), is provided from the optimized peak clipping pulse generator 504 to the time and amplitude shifter 506. The time and amplitude shifter 506 shifts p(n) and outputs the shifted clipping pulse to the adder 508, which scales p(n) based on the original signal and/or an updated signal (if on second or later iterations). The output of the adder 508 is provided to the signal updater 510, which subtracts the scaled and shifted p(n) from the current signal to obtain an updated signal. If no further iterations are required or desired, the output of the signal updater is the PARR signal; otherwise, the output of the signal updater is provided to the peak timing and amplitude detector 502, as described previously.

The number of iterations in the method may or may not be dictated by complexity and delay considerations. The PAR typically improves after each iteration, but there are diminishing returns in performance improvement after each iteration. That is because the original signal generally includes a small number, J, of large peaks, and the largest remaining peak is reduced on each iteration. After J iterations the large peaks will be reduced, leaving a signal with a large number of smaller peaks. Clipping small peaks generally results in only modest PAR improvement. Thus, each iteration in PAR reduction leads to a smaller reduction in clipping probability than the previous iteration.

Figure 6:
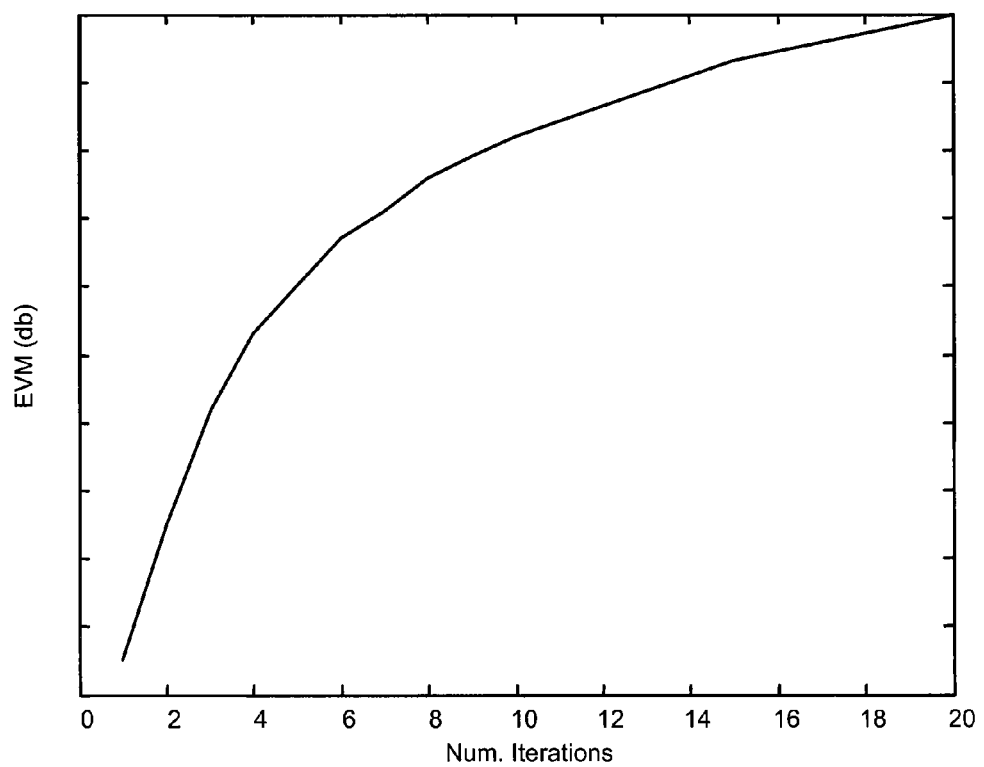
FIG. 6 depicts a conceptual graph illustrating how EVM increases with the number of iterations.

Each iteration causes clipping of a signal peak, so distortion increases with each iteration. The distortion introduced should not exceed the maximum allowable distortion of the signal. Allowable signal distortion is typically measured by both EVM and the signal's spectral mask. FIG. 6 depicts a conceptual graph 600 illustrating how EVM increases with the number of iterations. Note that the curve levels off as the number of iterations increases. That is because as PAR decreases, the clipping probability at a given PAR also decreases, hence clipping after PAR reduction results in less of an EVM increase than at the signal's original PAR. This can be exploited by additional iterations of PAR and/or in an optional second PAR reduction stage, as described in the next section.

Figure 7:
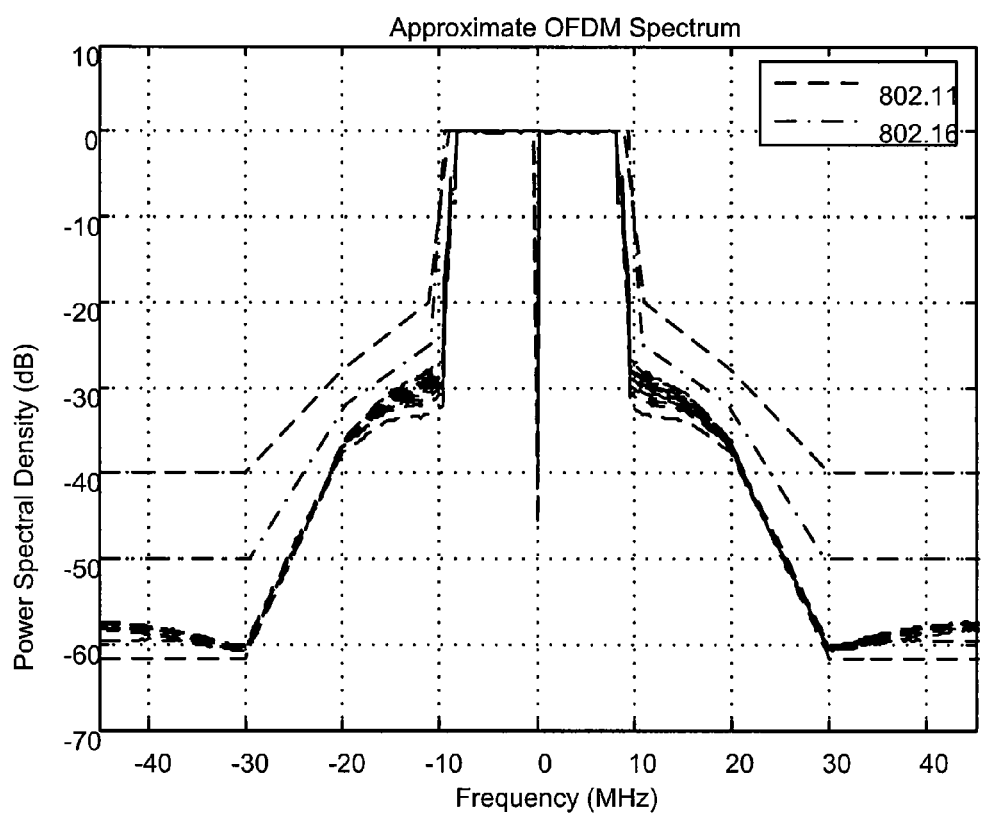
FIG. 7 depicts a conceptual graph illustrating a spectrum of an OFDM signal after PAR reduction for different numbers of iterations using a peak clipping pulse.

FIG. 7 depicts a conceptual graph 700 illustrating a spectrum of an OFDM signal after PAR reduction for different numbers of iterations using a peak clipping pulse. The peak clipping pulse may be, by way of example but not limitation, similar to the peak clipping pulse described with reference to FIGS. 2 and 3. The design of the peak clipping pulse should be roughly flat across the band of interest so as not to introduce in-band distortion, and it must also be designed so that the out-of-band signal components do not result in an OFDM signal that violates the spectral mask requirements. We see from the example of FIG. 3 that the example peak clipping pulse is indeed flat across the signal bandwidth with large peaks just outside this band. We also see from FIG. 7 that PAR reduction with this example pulse results in an OFDM signal that satisfies the spectral mask properties of both the 802.11 and 802.16 IEEE standards, despite the large out-of-band peaks that are introduced by the clipping pulse. In general the clipping pulse can be designed to meet the spectral mask properties of whatever system the OFDM signal is being designed for.

Multistage PAR Reduction

Figure 8:
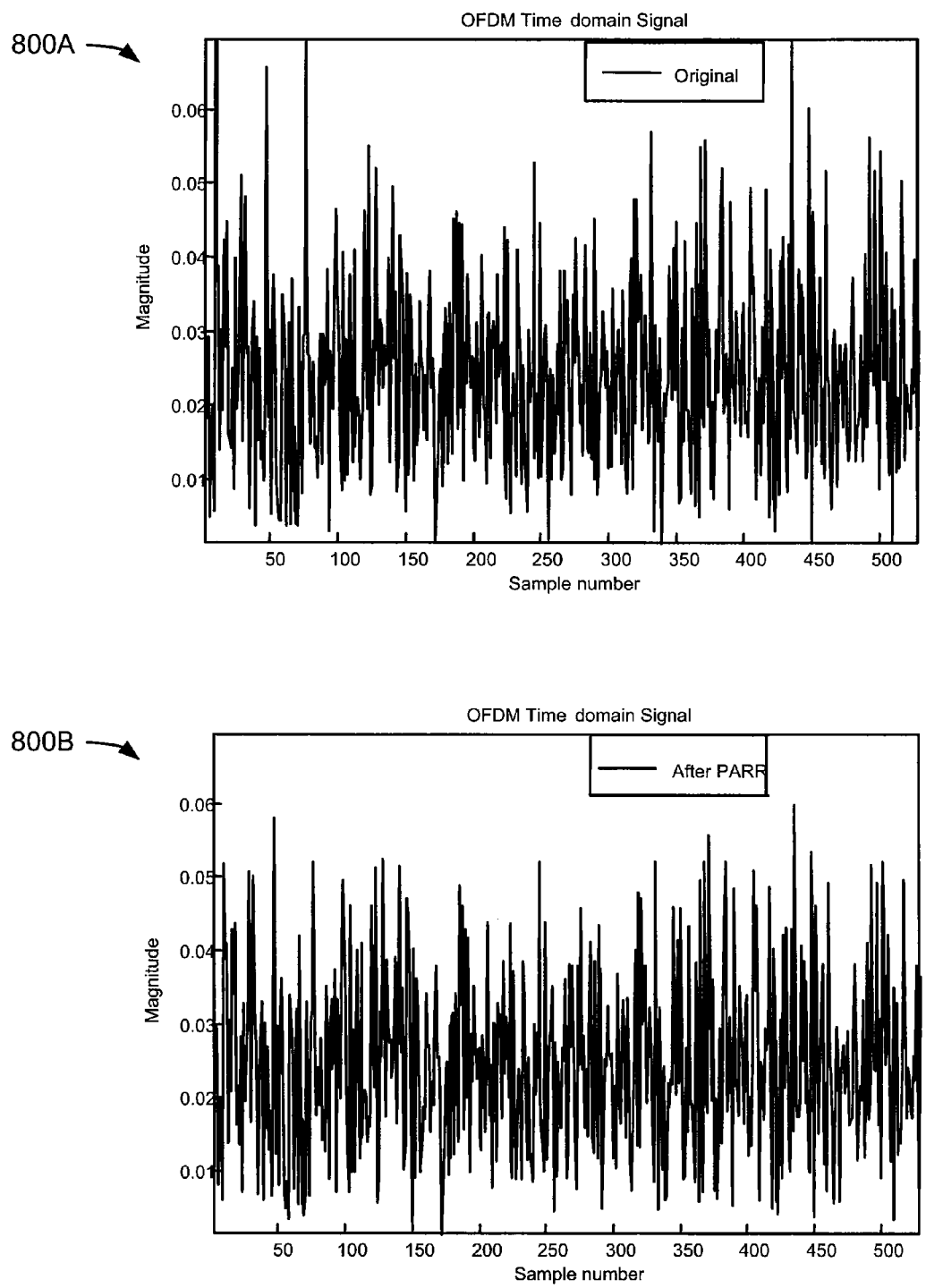
FIG. 8 depicts conceptual graphs illustrating an example of an original OFDM signal over time as well as the signal after a first stage of PAR reduction.

As mentioned above, beyond some number of iterations the technique described in the previous section may not lead to significant additional PAR reduction. That is because after some number of iterations the large peaks have been cancelled, and there remain many smaller peaks for which the initial clipping pulse, designed to cancel a few large peaks, is not as effective. FIG. 8 depicts conceptual graphs 800A and 800B illustrating an example of an original OFDM signal over time (800A) as well as the signal after a first stage of PAR reduction (800B). As is illustrated in the example of FIG. 8, the original signal has several large peaks, whereas the signal after PAR reduction has many more smaller peaks.

Due to diminishing returns in PAR reduction as the number of iterations increases, a large number of iterations may not reach the desired PAR target, or it may require an infeasible number of iterations to do so. Advantageously, to address this issue or for other reasons, one or more additional stages of PAR reduction can be used to achieve the PAR target while introducing minimal additional distortion. In multistage PAR reduction the first stage may be similar to the PAR reduction described previously. After this first stage, another stage of PAR reduction can be done using a different peak clipping pulse. This new peak clipping pulse is designed to reduce PAR when there are a large number of small peaks, and hence may differ significantly from the pulse used in stage 1 to cancel a small number of large peaks. The simplest method to use in the second stage is standard clipping: all pulses with PAR exceeding a given value are clipped to that value. Clipping on its own, or clipping and filtering, is commonly used in OFDM to reduce PAR, but it can lead to significant distortion. However, if clipping is done in the second or later stages of PAR reduction, after the initial stage described above, less distortion should result since after the first stage the resulting signal has smaller peaks (as shown in FIG. 8) and a lower clipping probability at any given PAR than the original signal.

Figure 9:
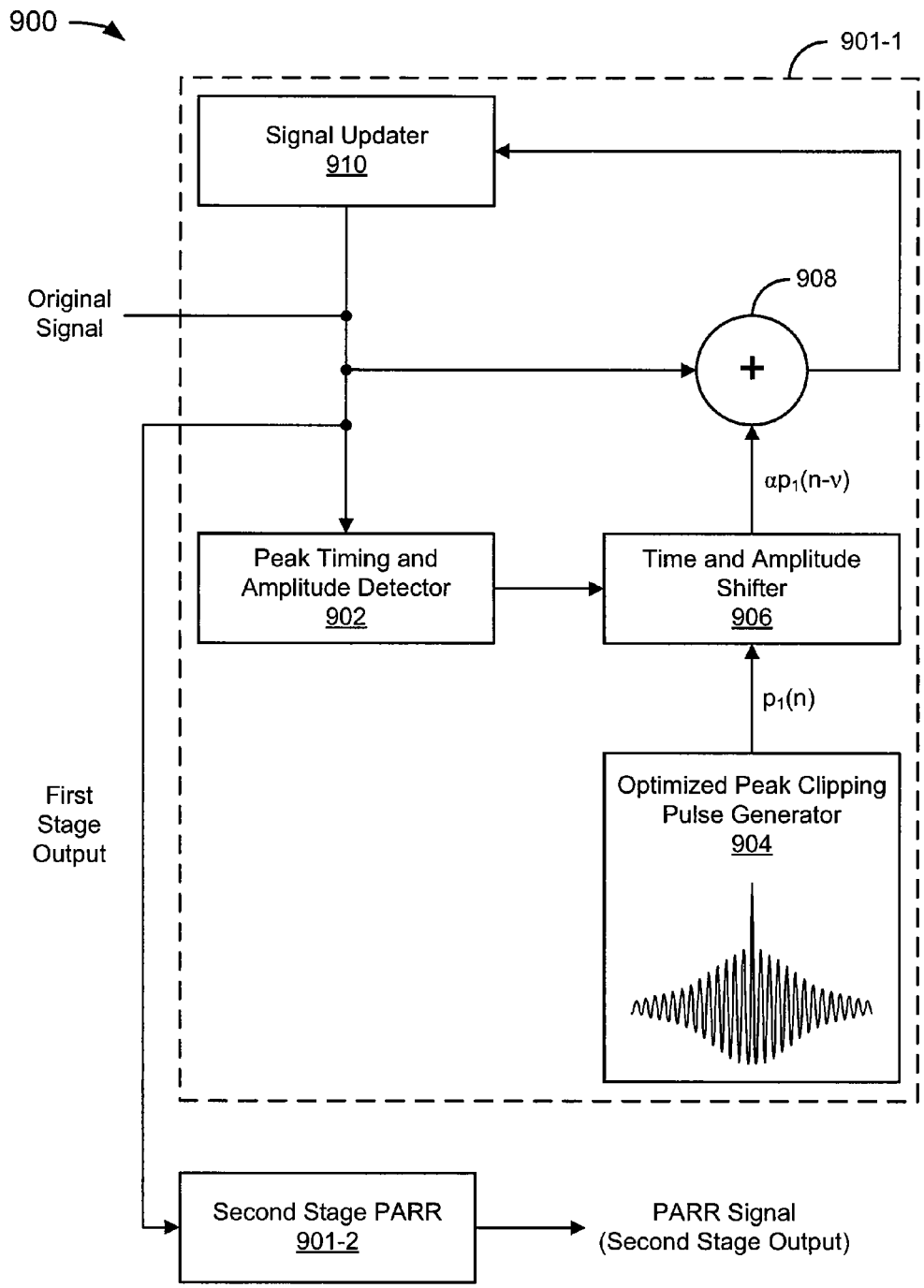
FIG. 9 depicts an example of a two-stage PARR system.

FIG. 9 depicts an example of a two-stage PARR system 900. The system 900 includes a first stage PARR 901-1 and a second stage PARR 901-2. The first stage PARR 901-1 includes components that are, for illustrative purposes only, similar to those of FIG. 5. For example, the first stage PARR 901-1 includes a peak timing and amplitude detector 902, an optimized peak clipping pulse generator 904, a time and amplitude shifter 906, an adder 908, and a signal updater 910. The first stage PARR 901-1 takes an original signal as input and outputs a first stage output after M iterations (see, e.g., FIG. 5 and associated text). The second stage PARR 901-2 takes the first stage output as input similar to the way in which the first stage PARR 901-1 takes the original signal as input, and outputs a PARR signal similar to the way in which the first stage PARR 901-1 outputs the first stage output. However, the peak clipping pulse may be different for each of the two stages.

Figure 10:
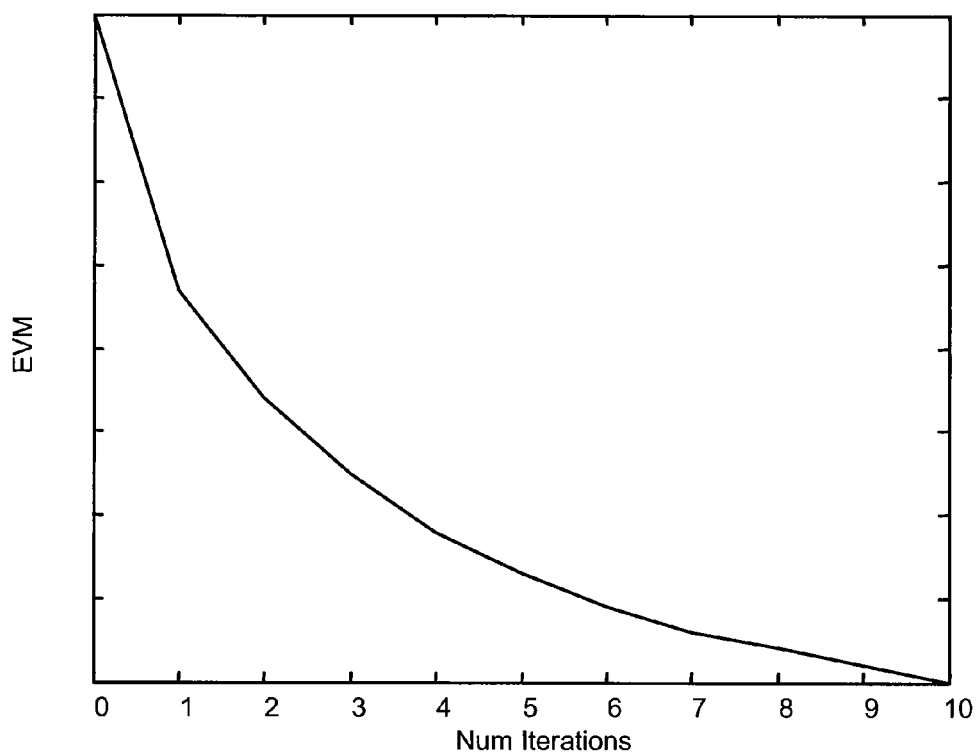
FIG. 10 depicts a conceptual graph of the performance of a two-stage PARR system.

FIG. 10 depicts a conceptual graph 1000 of the performance of a two-stage PARR system. The first stage uses the iterative algorithm illustrated in FIG. 5 with the number of iterations given on the x axis. The second stage performs clipping (using, by way of example but not limitation, a delta function clipping pulse) on any remaining signal peaks above $PAR_{target}$ times the average mean-square signal value, where $PAR_{target}$ is the desired PAR target value. EVM decreases with the number of iterations used in the first stage of the algorithm, as expected, since clipping with a delta function clipping pulse causes more distortion than clipping with an optimized clipping pulse. FIG. 10 also illustrates that the two-stage algorithm with 10 iterations in the first stage leads to a large EVM improvement over the traditional method of only clipping (0 iterations in stage 1). A more sophisticated peak clipping pulse in the second stage of the algorithm, applied iteratively or to all signal peaks simultaneously, should lead to further performance improvement. Additional stages with different peak clipping pulses might also further reduce PAR, although more than three stages is not anticipated to be of much benefit.

Multiple-Input Multiple-Output (MIMO) PAR Reduction

Figure 11:
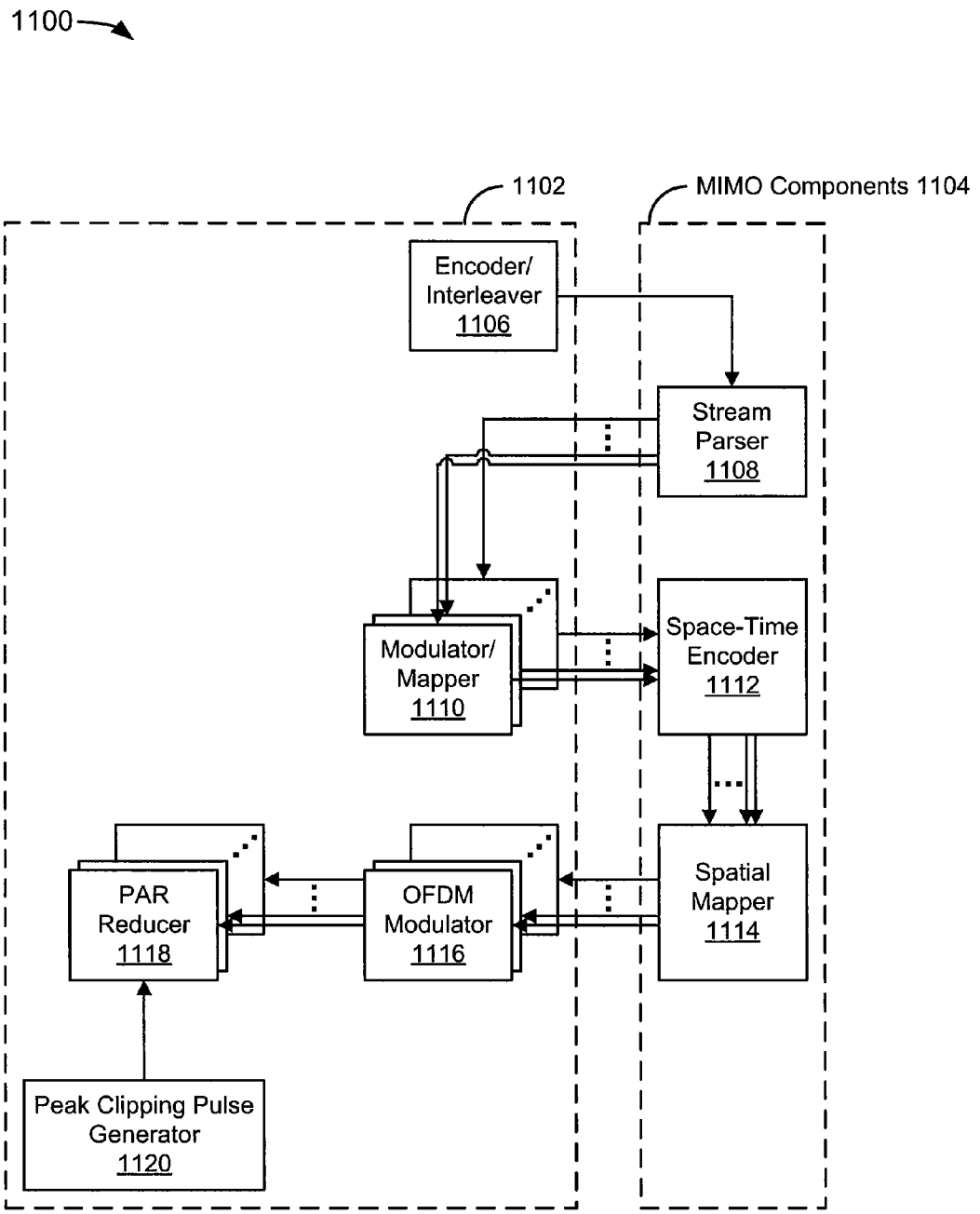
FIG. 11 depicts an example of a MIMO-OFDM system that applies PAR reduction to the OFDM signal associated with each spatial stream.

FIG. 11 depicts an example of a MIMO-OFDM system 1100 that applies PAR reduction to the OFDM signal associated with each spatial stream. The system 1100 includes components 1102 and MIMO components 1104. The components 1102 and MIMO components 1104 include an encoder/interleaver block 1106, a stream parser 1108, a plurality of modulator/mappers 1110, a space-time encoder 1112, a spatial mapper 1114, a plurality of OFDM modulators 1116, a plurality of PAR reducers 1118, and a peak clipping pulse generator 1120. As is shown in the example of FIG. 11, the stream parser 1108, the space-time encoder 1112, and the spatial mapper 1114 comprise the MIMO components 1104. One or more of the components 1102, in an alternative, could perhaps be implemented as MIMO components.

The encoder/interleaver block 1106, which is optional, may be similar to the encoder 106 and/or the interleaver 108 of FIG. 1. However, in the example of FIG. 11, the stream from the encoder/interleaver block 1106 is parsed by the stream parser 1108 into a plurality of signals. It should be noted that although the stream parser 1108 is included as part of the MIMO components 1104, the stream parser 1108 itself does not necessarily receive multiple inputs. Rather, the stream parser 1108 prepares a signal for MIMO processing by breaking it into separate signals.

Each of the plurality of signals from the stream parser 1108 is provided to respective modulator/mappers of the plurality of modulator/mappers 1110. Each of the plurality of modulator/mappers 1110 may be similar to the modulator/mapper 110 of FIG. 1. The space-time encoder 1112 receives, encodes, and provides the plurality of signals to the spatial mapper 1114, which maps the plurality of signals onto respective ones of the plurality of OFDM modulators 1116. Each of the plurality of OFDM modulators may be similar to the modulator 112 of FIG. 1 (in an OFDM implementation, at least). The plurality of OFDM modulators 1116 provide the plurality of signals to respective ones of the plurality of PAR reducers 1118. Each of the plurality of PAR reducers 1118 may be similar to the PARR block 104 of FIG. 1 (though it should be noted that at least part of the peak clipping pulse generator 1120 would be part of the PARR block 104). The peak clipping pulse generator 1120 provides a peak clipping pulse to each of the plurality of PAR reducers 1118. The peak clipping pulse may be the same or different for each of the plurality of PAR reducers, depending upon the implementation. In an alternative, each of the plurality of PAR reducers 1118 could have its own peak clipping pulse generator, instead of a single peak clipping pulse generator serving all of the plurality of PAR reducers 1118 as illustrated in the example of FIG. 11.

Figure 12:
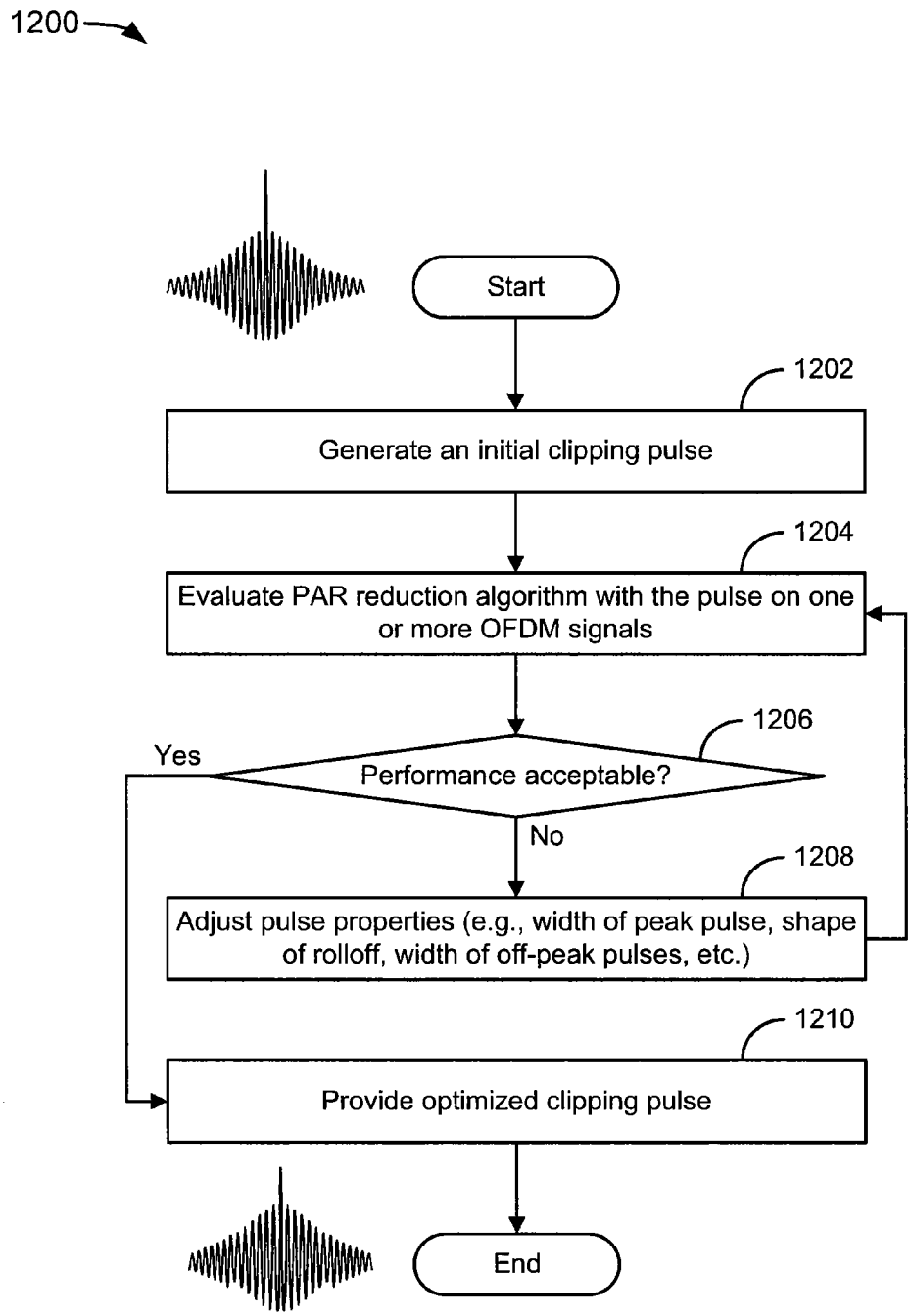
FIG. 12 depicts a flowchart of an example of designing an optimize peak clipping pulse.

FIG. 12 depicts a flowchart 1200 of an example of designing an optimize peak clipping pulse. In the example of FIG. 12, the flowchart 1200 starts at module 1202 where an initial clipping pulse is generated. The initial pulse may be generated, for example, by an optimization program that adjusts the clipping pulse time and frequency domain properties to ensure the pulse is below a spectral mask and will create minimal EVM distortion while reducing PAR. For example, the program may comprise an optimized search for a clipping pulse that is flat within the signal bandwidth of interest yet has large spikes in the frequency domain just outside the bandwidth of interest and slow rolloff after these spikes, e.g. as in FIG. 3, since this will not cause distortion in the signal band of interest but rather push distortion outside this band. The optimization program will search for a clipping pulse that satisfies these properties in the frequency domain while approximating a delta function in the time domain, and the program will determine the optimized clipping pulse with the best tradeoff between desirable time and frequency domain properties. Although the initial clipping pulse may be generated by an "optimization program," the pulse may be further optimized. The final clipping pulse is referred to in the example of FIG. 12 as the "optimized clipping pulse" because it is at least as optimized as the initial clipping pulse.

In the example of FIG. 12, the flowchart 1200 continues to module 1204 where a PARR algorithm is evaluated with the pulse on one or more OFDM signals. Although the exact number of OFDM signals is not critical, it is believed that using about 1000 OFDM signals would have advantageous results. Using a single OFDM signal would be of limited value, but the exact number of multiple OFDM signals may vary depending upon embodiment- and implementation-specific variables and environmental factors. One goal is to produce an optimized clipping signal; so if the number of OFDM signals used does not result in optimization, then the number of OFDM signals is probably lower than it should be. At the upper end, if a given number of OFDM signals results in no further improvement beyond a previous number, then the upper limit is somewhere below the given number. In either case, there is no requirement than fewer or more than the optimal number of OFDM signals be used; it will just take longer (or time will be wasted) reaching an acceptable performance.

In the example of FIG. 12, the flowchart 1200 continues to decision point 1206 where it is determined whether performance is acceptable for the pulse. In a non-limiting embodiment, three performance metrics are the spectral mask, EVM, and PAR. In the US, the spectral mask must typically be met due to FCC constraints. In other countries, there are frequently similar restrictions associated with the spectral mask. The spectral mask performance metrics may be evaluated without knowledge of FCC (or equivalent) constraints or adjusted dynamically depending upon specific spectral mask requirements. The EVM is typically dictated by a standard in which the pulse is to be used. Again, this metric may be estimated without application to a particular standard, or adjusted dynamically depending upon standard requirements.

In the example of FIG. 12, if it is determined that performance is not acceptable (1206-No), then the flowchart 1200 continues to module 1208 where pulse properties are adjusted. Examples of pulse properties are, by way of example but not limitation, width of peak pulse, shape of rolloff, width of off-peak pulses, etc. In general, any applicable known or convenient pulse property could be adjusted in this manner. This process typically requires human intuition, though it may be possible to develop an expert system capable of making adjustment recommendations, or making the adjustments directly. After adjusting the pulse properties, the flowchart 1200 returns to module 1204, as discussed previously.

In the example of FIG. 12, if it is determined that performance is acceptable (1206-Yes), then the flowchart 1200 continues to module 1210 where the optimized clipping pulse is provided. The recipient of the optimized clipping pulse may be, for example, a PARR block or PARR stage. It may be noted that the optimized clipping pulse could be the unmodified initial clipping pulse. However, in such a case, the initial clipping pulse must be generated using an optimization algorithm that may have benefited from knowledge acquired through the use of the optimization process described herein.

Figure 13:
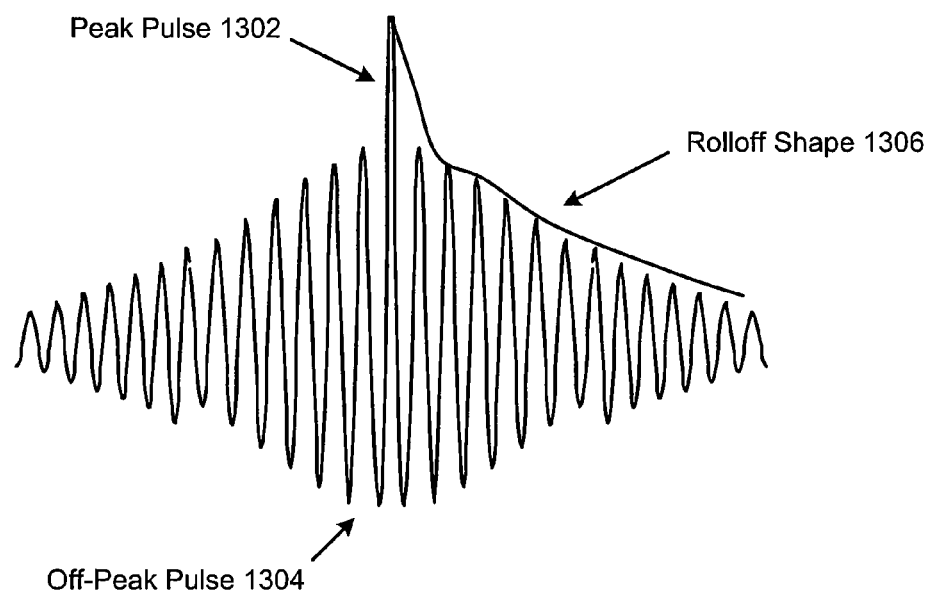
FIG. 13 depicts a conceptual diagram of an example of an optimized peak clipping pulse.

FIG. 13 depicts a conceptual diagram 1300 of an example of an optimized peak clipping pulse. The conceptual diagram 1300 is intended to give a general idea of the pulse properties described with reference to FIG. 12, and is not intended to represent an actual optimized clipping pulse (though it very well could be). The diagram 1300 illustrates a peak pulse 1302, an off-peak pulse 1304, and a rolloff shape 1306.

Systems described herein may be implemented on any of many possible hardware, firmware, and software systems. Typically, systems such as those described herein are implemented in hardware on a silicon chip. Algorithms described herein are implemented in hardware, such as by way of example but not limitation RTL code. However, other implementations may be possible. The specific implementation is not critical to an understanding of the techniques described herein and the claimed subject matter.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A system comprising:
 a peak detector coupled to a signal input;
 a pulse generator;
 a shifter coupled to the peak detector and the pulse generator;
 an adder coupled to the signal input and the shifter;
 a signal updater coupled to the adder and a signal output;
 wherein, in operation,
  a first signal is received at the signal input,
  the peak detector detects peak time and amplitude of the first signal,
  the pulse generator generates a first optimized peak clipping pulse and a second optimized peak clipping pulse,
  the shifter receives at least the peak time and amplitude of the first signal from the peak detector, the first optimized peak clipping pulse from the pulse generator, and the second optimized peak clipping pulse from the pulse generator and produces a first shifted clipping pulse from the first signal and the first optimized peak clipping pulse and a second shifted clipping pulse from the first signal and the second optimized peak clipping pulse, the adder receives the first signal, the first shifted clipping pulse, and the second shifted clipping pulse and scales the first signal with the shifted clipping pulse to form a first scaled and shifted clipping pulse, the signal updater receives the first scaled and shifted clipping pulse and subtracts the first scaled and shifted clipping pulse from the first signal to produce a second signal, the peak detector detects peak time and amplitude of the second signal, the pulse generator generates a third optimized peak clipping pulse, the shifter receives at least the peak time and amplitude of the second signal from the peak detector and the third optimized peak clipping pulse from the pulse generator and produces a third shifted clipping pulse, the adder receives the second signal and the third shifted clipping pulse and scales the second signal with the third shifted clipping pulse, the signal updater receives the second scaled and shifted clipping pulse and subtracts the second scaled and shifted clipping pulse from the second signal to produce a third signal.

2. The system of claim 1, wherein, in operation, the second signal is output on the signal output.

3. The system of claim 1, further comprising a second stage peak-to-amplitude ratio (PAR) reducer, wherein, in operation,
the second signal is provided to the second stage PAR reducer,
the second stage PAR reducer PAR reduces the second signal,
the second stage PAR reducer outputs the PAR reduced signal.

4. The system of claim 1, wherein the first signal includes an orthogonal frequency-division multiplexing (OFDM) signal.

5. The system of claim 1, wherein:
the peak clipping pulse is roughly flat across a band of interest so as not to introduce in-band distortion,
the peak clipping pulse complies with spectral mask and error vector magnitude (EVM) requirements.

6. A system comprising:
a first PAR reducer comprising:
  a peak detector coupled to a signal input;
  a pulse generator;
  a shifter coupled to the peak detector and the pulse generator;
  an adder coupled to the signal input and the shifter;
  a signal updater coupled to the adder and a signal output;
a modulator coupled to the first PAR reducer;
one or more additional PAR reducers;
one or more additional modulators respectively coupled to the one or more additional PAR reducers;
a multiple-input multiple-output (MIMO) spatial mapper coupled to the modulator and the one or more additional modulators;
wherein, in operation,
a first signal is received at the signal input,
the peak detector detects peak time and amplitude of the first signal,
the pulse generator generates an first optimized peak clipping pulse, the shifter receives at least the peak time and amplitude of the first signal from the peak detector and the first optimized peak clipping pulse from the pulse generator and produces a first shifted clipping pulse, the adder receives the first signal and the first shifted clipping pulse and scales the first signal with the first shifted clipping pulse to form a first scaled and shifted clipping pulse, the signal updater receives the first scaled and shifted clipping pulse and subtracts the first scaled and shifted clipping pulse from the first signal to produce a second signal, the MIMO spatial mapper maps a plurality of MIMO signals onto respective ones of the modulator and one or more additional modulators and the modulator and one or more additional modulators provide the plurality of MIMO signals to respective ones of the first PAR reducer and one or more additional PAR reducers, the peak detector detects peak time and amplitude of the second signal, the pulse generator generates a second optimized peak clipping pulse, the shifter receives at least the peak time and amplitude of the second signal from the peak detector and the second optimized peak clipping pulse from the pulse generator and produces a second shifted clipping pulse, the adder receives the second signal and the second shifted clipping pulse and scales the second signal with the second shifted clipping pulse, the signal updater receives the second scaled and shifted clipping pulse and subtracts the second scaled and shifted clipping pulse from the second signal to produce a third signal.

7. The system of claim 6, wherein, in operation, the second signal is output on the signal output.

8. The system of claim 6, further comprising a second stage peak-to-amplitude ratio (PAR) reducer, wherein, in operation,
the second signal is provided to the second stage PAR reducer,
the second stage PAR reducer PAR reduces the second signal,
the second stage PAR reducer outputs the PAR reduced signal.

9. The system of claim 6, wherein the first signal includes an orthogonal frequency-division multiplexing (OFDM) signal.

10. The system of claim 6, wherein:
the peak clipping pulse is roughly flat across a band of interest so as not to introduce in-band distortion,
the peak clipping pulse complies with spectral mask and error vector magnitude (EVM) requirements.

11. A system comprising:
a first PAR reducer comprising:
  a peak detector coupled to a signal input;
  a pulse generator;
  a shifter coupled to the peak detector and the pulse generator;
  an adder coupled to the signal input and the shifter;
  a signal updater coupled to the adder and a signal output;
a plurality of PAR reducers, including the first PAR reducer;
a stream parser;
a modulator/mapper block, coupled to the stream parser, having a plurality of modulator/mappers;

a multiple-input multiple-output (MIMO) space-time encoder coupled to the modulator/mapper block;

a MIMO spatial mapper coupled to the MIMO space-time encoder;

an OFDM modulator block, coupled to the MIMO spatial mapper and the plurality of PAR reducers, having a plurality of OFDM modulators;

wherein, in operation, a first signal is received at the signal input, the peak detector detects peak time and amplitude of the first signal, the pulse generator generates a first optimized peak clipping pulse, the shifter receives at least the peak time and amplitude of the first signal from the peak detector and the first optimized peak clipping pulse from the pulse generator and produces a first shifted clipping pulse, the adder receives the first signal and the first shifted clipping pulse and scales the first signal with the first shifted clipping pulse to form a first scaled and shifted clipping pulse, the signal updater receives the first scaled and shifted clipping pulse and subtracts the first scaled and shifted clipping pulse from the first signal to produce a second signal;

the stream parser receives a raw signal, the stream parser breaks the signal into a plurality of separate signals, the modulator/mappers each receive and process the separate signals;

the modulator/mappers each provide the separate signals to the MIMO space-time encoder, the MIMO space-time encoder provides the separate signals to the MIMO spatial mapper, the MIMO spatial mapper provides the separate signals to respective ones of the OFDM modulators, the OFDM modulators provide the separate signals to respective ones of the PAR reducers, wherein one of the separate signals is the first signal, the peak detector detects peak time and amplitude of the second signal, the pulse generator generates a second optimized peak clipping pulse, the shifter receives at least the peak time and amplitude of the second signal from the peak detector and the second optimized peak clipping pulse from the pulse generator and produces a second shifted clipping pulse, the adder receives the second signal and the second shifted clipping pulse and scales the second signal with the second shifted clipping pulse, the signal updater receives the second scaled and shifted clipping pulse and subtracts the second scaled and shifted clipping pulse from the second signal to produce a third signal.

12. The system of claim 11, wherein, in operation, the second signal is output on the signal output.

13. The system of claim 11, further comprising a second stage peak-to-amplitude ratio (PAR) reducer, wherein, in operation, the second signal is provided to the second stage PAR reducer, the second stage PAR reducer PAR reduces the second signal, the second stage PAR reducer outputs the PAR reduced signal.

14. The system of claim 11, wherein the first signal includes an orthogonal frequency-division multiplexing (OFDM) signal.

15. The system of claim 11, wherein:

the peak clipping pulse is roughly flat across a band of interest so as not to introduce in-band distortion, the peak clipping pulse complies with spectral mask and error vector magnitude (EVM) requirements.

* * * * *